United States Patent
Georgin

(10) Patent No.: US 11,565,682 B2
(45) Date of Patent: Jan. 31, 2023

(54) HEALTH MONITORING SYSTEMS AND METHODS FOR SERVO VALVES

(71) Applicant: GOODRICH CORPORATION, Charlotte, NC (US)

(72) Inventor: Marc Georgin, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 245 days.

(21) Appl. No.: 17/109,803

(22) Filed: Dec. 2, 2020

(65) Prior Publication Data

US 2022/0169229 A1 Jun. 2, 2022

(51) Int. Cl.
*B60T 17/22* (2006.01)
*B60T 8/17* (2006.01)
*B60T 8/171* (2006.01)
*B64D 45/00* (2006.01)

(52) U.S. Cl.
CPC ............ *B60T 17/221* (2013.01); *B60T 8/171* (2013.01); *B60T 8/1703* (2013.01); *B60T 2240/06* (2013.01); *B60T 2270/406* (2013.01); *B64D 2045/0085* (2013.01)

(58) Field of Classification Search
CPC ...... B60T 17/221; B60T 8/1703; B60T 8/171; B60T 2240/06; B60T 2270/406; B60T 8/325; B60T 17/22; B64D 2045/0085; B64C 25/42
See application file for complete search history.

(56) References Cited

U.S. PATENT DOCUMENTS

| | | | |
|---|---|---|---|
| 7,128,376 B2 | 10/2006 | Williams et al. | |
| 9,897,116 B2 | 2/2018 | Ozzello | |
| 10,442,422 B2 | 10/2019 | Kordik et al. | |
| 2004/0239173 A1 | 12/2004 | Williams et al. | |
| 2019/0193708 A1* | 6/2019 | Kordik | B60T 17/22 |
| 2020/0017202 A1* | 1/2020 | Georgin | B60T 8/1761 |
| 2020/0130661 A1* | 4/2020 | Arsenault | B64C 25/46 |

FOREIGN PATENT DOCUMENTS

| | | |
|---|---|---|
| CN | 107515105 | 12/2017 |
| EP | 3501927 | 6/2019 |
| EP | 3594076 | 1/2020 |
| EP | 3653456 | 5/2020 |

OTHER PUBLICATIONS

European Patent Office; European Search Report dated Apr. 8, 2022 in Application No. 21211102.5.

* cited by examiner

*Primary Examiner* — Freddie Kirkland, III
(74) *Attorney, Agent, or Firm* — Snell & Wilmer L.L.P.

(57) ABSTRACT

A system for performing frequency response health monitoring of a servo valve prior to flight of an aircraft may comprise: the servo valve; and a brake controller in electrical communication with the servo valve, the brake controller configured to: determine the brake controller is powering up, supply a variable current to the servo valve to perform the frequency response health monitoring to the servo valve in response to determining the brake controller is powering up, and determine a health status of the servo valve based on the frequency response health monitoring.

20 Claims, 5 Drawing Sheets

HEALTH MONITORING SYSTEMS AND METHODS FOR SERVO VALVES

FIELD

The present disclosure relates to control systems and methods for health monitoring servo valve frequency response for aircraft brakes prior to flight.

BACKGROUND

Many aircraft include landing gear having wheel assemblies to allow the aircraft to travel along the ground during taxi, takeoff, and landing. Over service life, servo valves may experience performance degradation in frequency characteristics due to wear and tear, as well as operating in brake fluid that becomes dirtier over time. Particles may cause slip inside a sleeve/spool assembly and lower a servo valve performance, causing a change in static and dynamic characteristics of servo valves. The control of servo valves may degrade in response to these changes in static and dynamic characteristics causing oscillations due to the coupling of the control characteristics and servo valve dynamics.

SUMMARY

A system for performing frequency response health monitoring of a servo valve prior to flight of an aircraft is disclosed herein. The system may comprise: the servo valve; and a brake controller in electrical communication with the servo valve, the brake controller configured to: determine the brake controller is powering up, supply a variable current to the servo valve to perform the frequency response health monitoring to the servo valve in response to determining the brake controller is powering up, and determine a health status of the servo valve based on the frequency response health monitoring.

In various embodiments, the brake controller may be further configured to calculate an average phase shift over a predetermined time period in response to supplying the variable current to the servo valve. The brake controller may be further configured to compare the average phase shift to a phase shift threshold. The brake controller may be further configured to count a number of phase shift exceedances over a plurality of brake controller power cycles. The brake controller may be further configured to generate a message indicating a service will be needed soon to an indicator. The system may further comprise a first throttle and a second throttle, wherein the brake controller is further configured to determine both the first throttle and the second throttle are not in a forward position prior to performing the frequency response health monitoring. The system may further comprise a weight on wheels sensor, wherein the brake controller is configured to receive a measurement from the weight on wheels sensor and determine whether the aircraft is grounded.

A method of performing a frequency response health monitoring for a servo valve of a braking system is disclosed herein. The method may comprise: receiving, via a brake controller, a first indication whether an aircraft is grounded and not moving; receiving, via the brake controller, a second indication whether braking is being applied to the braking system; supplying, via the brake controller, a variable current to the servo valve in response to the first indication being true and the second indication being false; comparing, via the brake controller, an average phase shift over a predetermined period of time to a predetermined phase shift threshold; and determining, via the brake controller, whether the average phase shift exceeds the predetermined phase shift threshold.

In various embodiments, the method may further comprise determining, via the brake controller, the brake controller is powering up. The first indication and the second indication may be received in response to the brake controller powering up. Receiving the first indication may further comprise receiving, via the brake controller, a throttle indicator indicating a throttle is not forward and a weight on wheels indicator indicating there is a weight on a wheel for a main landing gear. The method may further comprise counting, via the brake controller, a number of continuous phase shift exceedances over a plurality of brake controller power cycles. The method may further comprise determining, via the brake controller, the number of continuous phase shift exceedances over the plurality of brake controller power cycles exceeds a predetermined threshold of phase shift exceedances. The method may further comprise generating, via the brake controller, a service message in response to the number of continuous phase shift exceedances exceeding the predetermined threshold of phase shift exceedances.

A method of determining a service valve health status is disclosed herein. The method may comprise: performing, via a brake controller, a plurality of frequency response health monitoring tests for a servo valve; supplying, via the brake controller, a variable current to the servo valve for each frequency response health monitoring test in the plurality of frequency response health monitoring tests; and comparing, via the brake controller, a phase shift over a predetermined period of time to a predetermined phase shift threshold.

In various embodiments, the method may further comprise in response to the phase shift exceeding the predetermined phase shift threshold: counting, via the brake controller, a number of continuous phase shift exceedances. The method may further comprise generating, via the brake controller, a service message in response to the number of continuous phase shift exceedances exceeding a predetermined number of continuous phase shift exceedances. Each test in the plurality of frequency response health monitoring tests are performed in response to the brake controller determining the brake controller is powering up. Each test in the plurality of frequency response health monitoring tests may be performed for a respective power cycle of the brake controller. The method may further comprise determining, via the brake controller, whether the phase shift exceeds the predetermined phase shift threshold.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 5 illustrates a method for performing frequency response health monitoring of a servo valve, in accordance with various embodiments; and.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
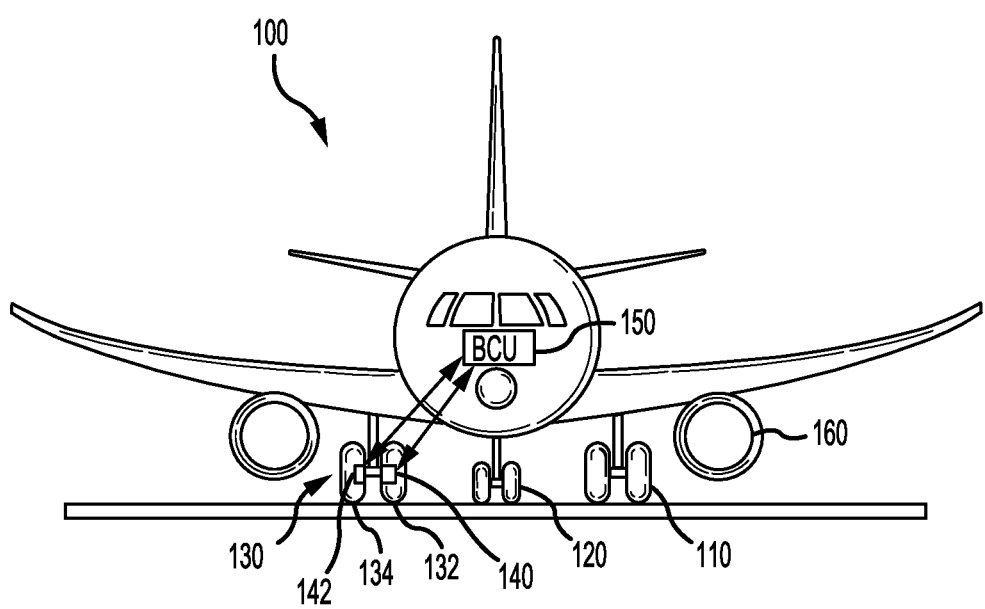
FIG. 1 illustrates an aircraft having multiple landing gear and brakes, in accordance with various embodiments.

Referring now to FIG. 1, an aircraft 100 in accordance with various embodiments can include multiple landing gear including a first landing gear 110, a second landing gear 120, and a third landing gear 130. Each landing gear may include one or more wheel assemblies. For example, the third landing gear 130 includes an inner wheel assembly 132 and an outer wheel assembly 134.

The aircraft 100 may further include one or more brake coupled to each wheel assembly. For example, a first brake 140 may be coupled to the inner wheel assembly 132, and a second brake 142 may be coupled to the outer wheel assembly 134. The first brake 140 may apply a braking force to the inner wheel assembly 132 upon receiving a brake command. Similarly, the second brake 142 may apply a braking force to the outer wheel assembly 134 upon receiving a brake command. In various embodiments, multiple brakes may apply a braking force to the inner wheel assembly 132.

The aircraft 100 may further include a brake control unit (BCU) or brake controller 150. The brake controller 150 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the brake controller 150 may be specifically designed for controlling operation of aircraft brakes. The brake controller 150 may control operation of the first brake 140 and the second brake 142 under normal operating conditions.

The aircraft 100 may further include one or more gas turbine engine 160. The gas turbine engine 160 may be controlled by a pilot (such as by controlling a throttle 212 in a cockpit) to generate thrust to accelerate the aircraft 100.

Figure 2:
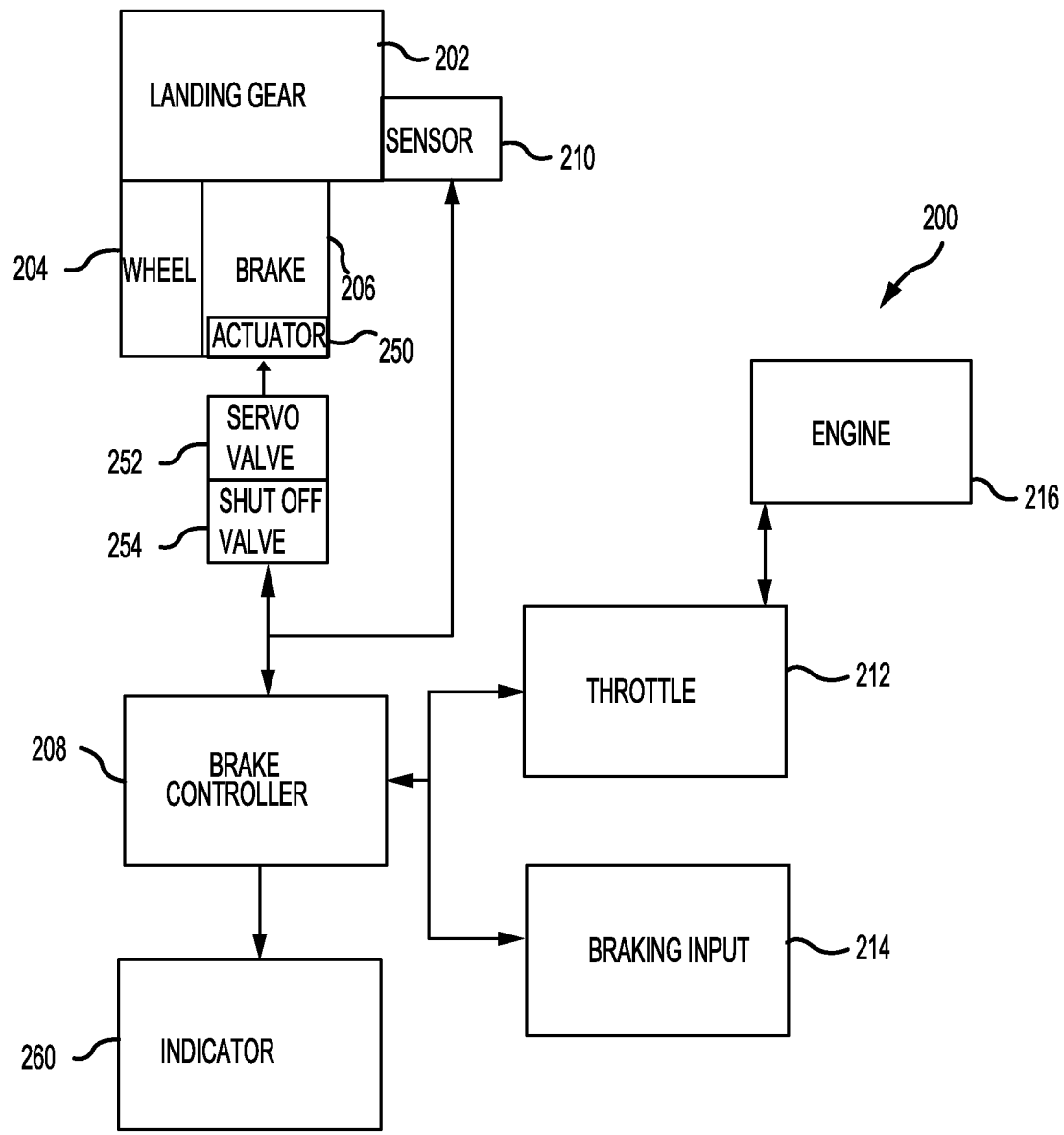
FIG. 2 illustrates a system for controlling a brake to perform a frequency response health monitoring for a servo valve, in accordance with various embodiments.

Referring now to FIG. 2, a system 200 may be used to monitor servo valve health of an aircraft brake system prior to flight of the aircraft, is illustrated in accordance with various embodiments. The servo valve health monitoring may be performed automatically. The system 200 may be implemented in an aircraft such as the aircraft 100 of FIG. 1. The system 200 may include one or more landing gear 202 that includes one or more wheel or wheel assembly 204. The system 200 may further include an actuator 250 fluidly coupled to a servo valve 252 and a shut off valve 254. The actuator 250 is designed to apply force to a brake assembly in response to a hydraulic pressure being provided to the actuator 250 via the servo valve 252, which may in turn apply torque to, and reduce rotational velocity of, the wheel assembly 204. The system 200 may also include a brake controller 208 designed to control operation of the servo valve 252.

The system 200 may further include a sensor 210 designed to detect whether the aircraft is on the ground. For example, the sensor 210 may include a weight on wheels (WoW) sensor coupled to the landing gear 202 and configured to detect a force on wheel assembly 204 to signify the aircraft (e.g., aircraft 100) is on the ground and provide an input to the brake controller 208. Although illustrated as being coupled to the landing gear 202, the sensor 210 is not limited in this regard.

The system 200 may further include a gas turbine engine 216, a throttle 212, and a braking input device 214. The engine 216 may generate thrust to propel a corresponding aircraft. The throttle 212 may include an input device, such as a joystick or other input device, which may be used to request power from the engine 216. For example, a pilot may use the throttle 212 to request thrust from the engine 216.

The braking input device 214 may include an input device which may be used to manually control braking of the brake 206. For example, the braking input device 214 may include an emergency handle, pilot pedals, or the like.

Figure 3:
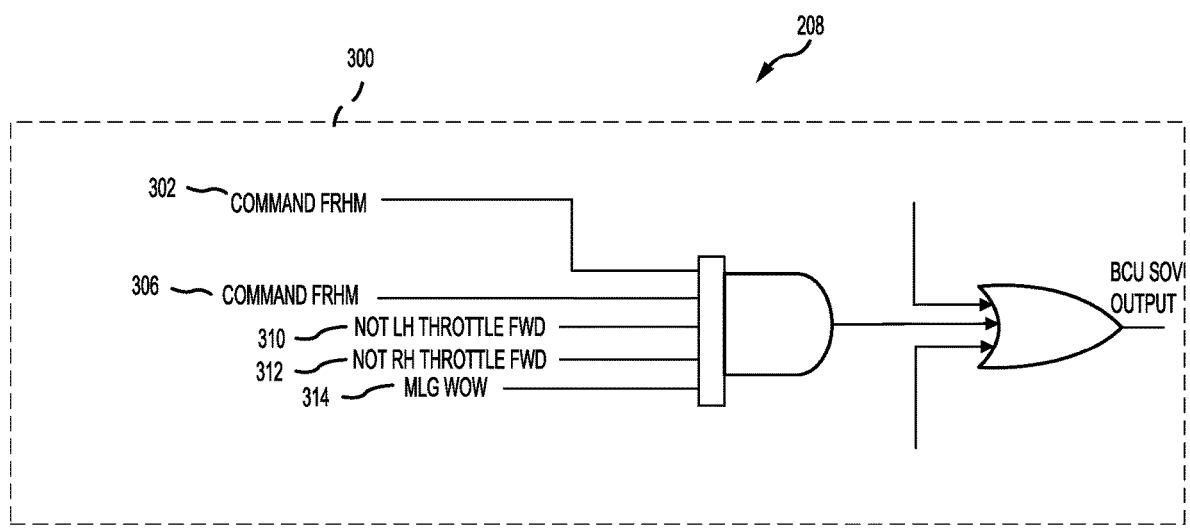
FIG. 3 illustrates an interlock function of a brake controller including frequency response health monitoring logic, in accordance with various embodiments.

Referring now to FIGS. 2 and 3, the brake controller 208 may include logic for controlling operation of the brake 206. In particular, the brake controller 208 may include an interlock function 300. The interlock function 300 may receive multiple inputs and may control operation of the brake based on the inputs. In particular, the interlock function 300 may control hydraulic power supply to the servo valve 252. The actuator 250 may apply force to the brake 206 as commanded by the brake controller 208 through servo valve 252. The inputs may include a first frequency health monitoring (FRHM) command 302. The first FRHM command may be received in response to the brake controller 208 powering up. The first FRHM command may correspond to a request for the shut off valve 254 of an inboard brake assembly to open and provide pressure to the servo valve 252 of the inboard brake assembly. Similarly, the second FRHM command may correspond to a request for the shut off valve 254 of an outboard brake assembly to open and provide pressure to the servo valve 252 of the outboard brake assembly.

The inputs may further include a left hand throttle not being forward 310 and a right hand throttle not being forward 312. The left hand throttle not being forward 310 and the right hand throttle not being forward 312 may ensure that the aircraft is not moving. For example, the left hand throttle being in a forward position would correspond to input from the throttle 212 requesting power be generated from a left-handed engine 216, and the right hand throttle forward 310 may correspond to input from the throttle 212 requesting power be generated from a right-handed engine 214.

The inputs may also include a main landing gear weight on wheels (MLG WoW) signal 314. The MLG WoW signal 314 may be received from the sensor 210 of the landing gear 202 in response to a force being exerted on the wheels of the landing gear 202. In this regard, the MLG WoW signal will ensure the aircraft is on the ground.

The interlock function 300 may be used to control the brake 206 to supply hydraulic fluid to the servo valve by either closing or opening the shut off valve 254. For example, the interlock function 300 may control the shut off valve 254 to provide hydraulic power supply to the servo valve 252. In particular, the interlock function 300 may control the shut off valve 254 by opening the shut off valve 254 when there is no braking to provide hydraulic power supply to the servo valve 252 in response to the first FRHM command 302, the second FRHM command 306, the left hand throttle not being forward 310, the right hand throttle not being forward 312 (indicating that no power is being requested of the engine 216) and the MLG WoW being true (indicating the aircraft is on the ground). In response to current being supplied to the servo valve 252, the servo valve may output pressure to the actuator 250 of the brake 206. Inclusion of the throttle not being forward signals 310, 312 in the interlock function 300 provides protection against unwanted braking (such as when the aircraft is about to take off).

Inclusion of the first FRHM command 302 and the second FRHM command 306 in the interlock function 300 allows automatic testing of the servo valve 252 of the brake 206 in response to the brake controller 208 determining that the aircraft is on the ground before or during taxiing without requiring any hardware changes in the system 200.

Figure 4:
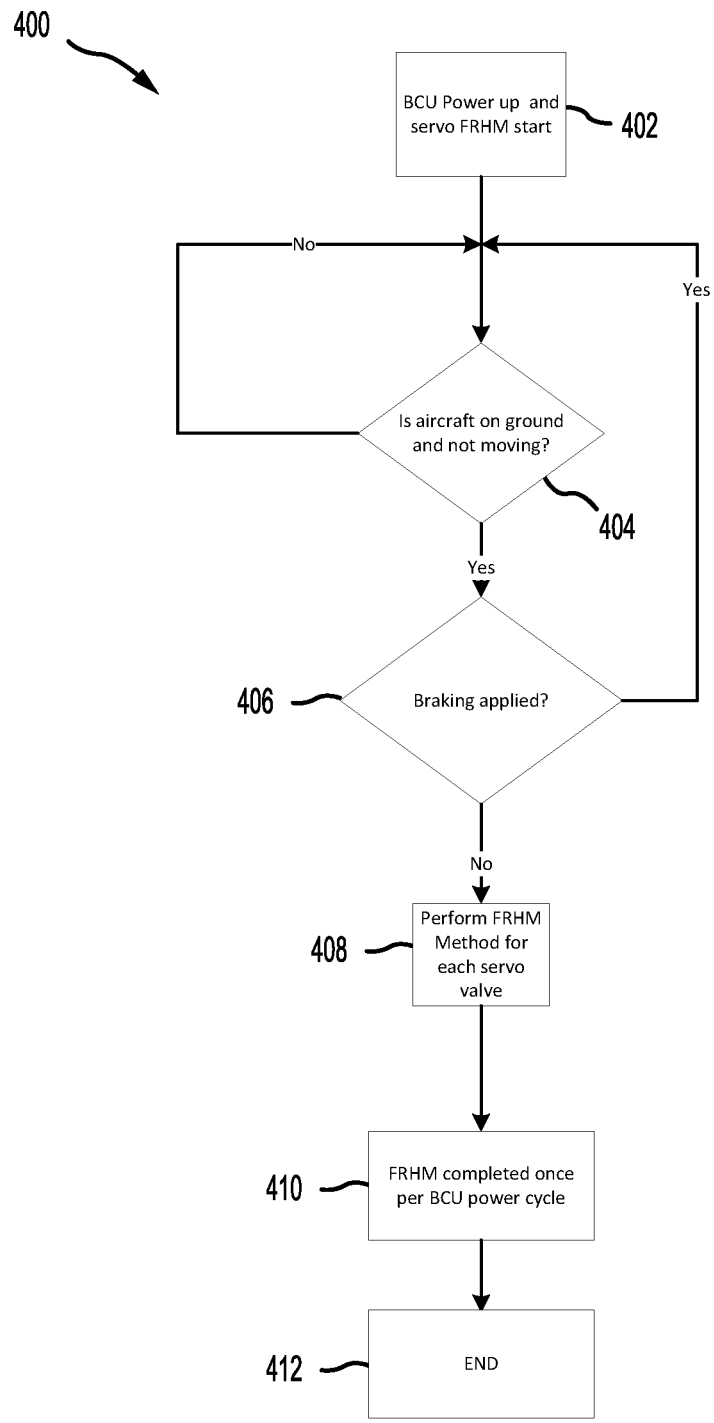
FIG. 4 illustrates a method for performing frequency response health monitoring of a servo valve, in accordance with various embodiments.

Referring now to FIG. 4, a method 400 may be used to perform health monitoring of a servo valve 252 from FIG. 2 prior to flight of an aircraft, in accordance with various embodiments. The method 400 may start in block 402. In block 402, the brake controller may determine that the brake controller 208 from FIG. 2 has been powered up (e.g., when the aircraft is powered on by a pilot). In block 404, the brake controller may further determine whether the aircraft is on the ground and not moving. For example, the brake controller may make this determination in response to receiving an aircraft speed from a speed sensor or the like and comparing it to a predetermined threshold. The predetermined threshold may be less than 10 knots, or the like. In this regard, the method 400 may ensure the aircraft is not about to take off.

If the result of block 404 is false then the method 400 may re-check block 404 after a predetermined period of time (e.g., 30 seconds, 1 minute, or the like). Otherwise, the method 400 may proceed to block 406. In block 406, the brake controller may determine if braking is being applied. For example, the brake controller may receive a braking input (e.g., braking input device 214), such as an emergency handle, or a braking pedal.

If the result of block 406 is true, then the method 400 may re-check block 404 after a predetermined period of time (e.g., 30 seconds, 1 minute, or the like). Otherwise, the method 400 may proceed to block 408. In block 408, the brake controller may send a frequency response health monitoring (FHRM) command to each servo valve (e.g., the command may be sent in response to the interlock 300 from FIG. 3 being true). In various embodiments, the FHRM command may initiate a FRHM method (e.g., method 500 as described further herein).

In block 410, after the frequency response health monitoring of the servo valve has been performed, the brake controller may prevent a frequency response health monitoring of the servo valve from being performed again. For example, a frequency response health monitoring of the servo valves may be performed only once per brake controller power cycle. In block 412, the method 400 may end.

Figure 5:
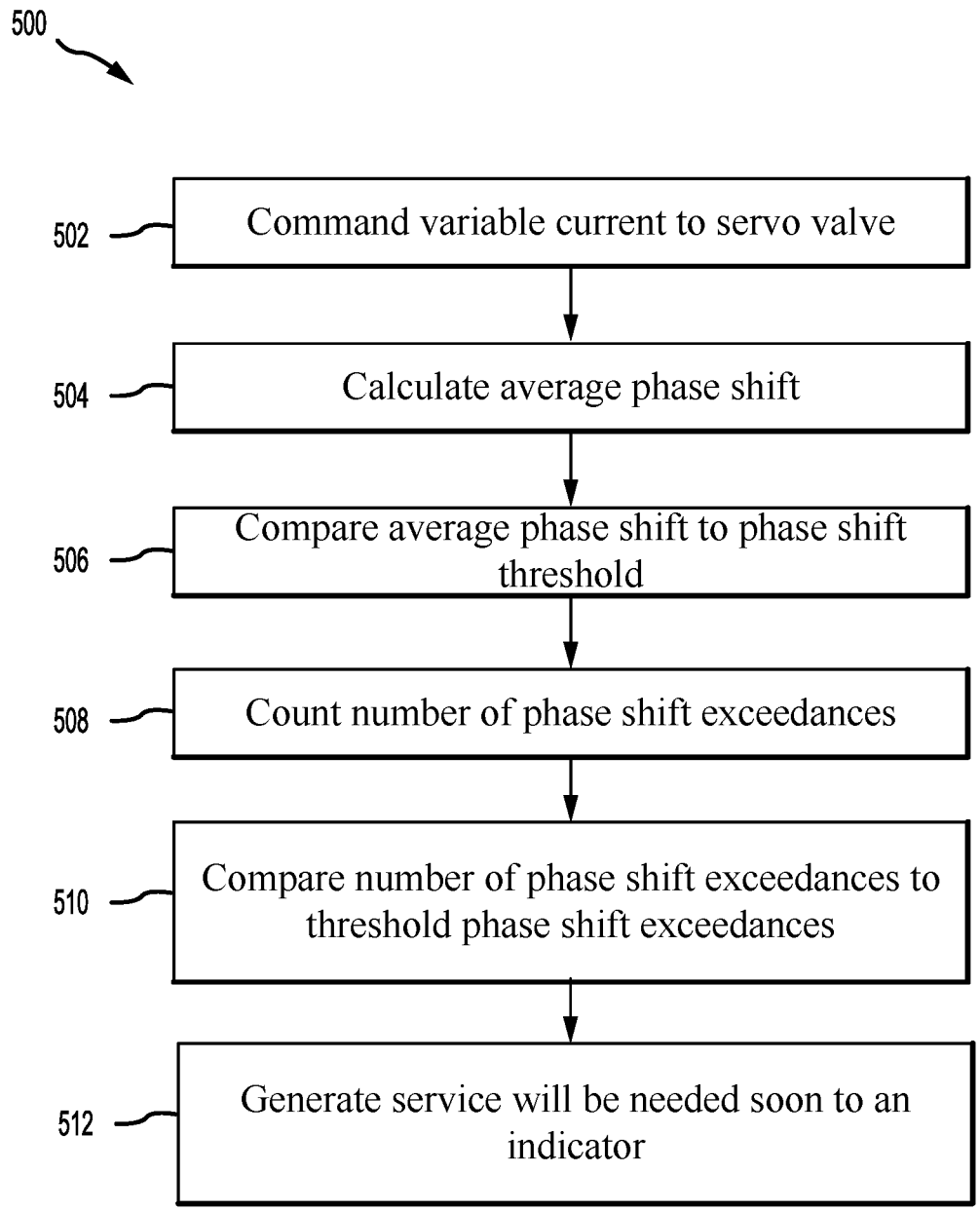

Turning now to FIG. 5, a method 500 may be performed by a brake controller to perform a frequency response health monitoring of a servo valve after brake controller power up. In various embodiments, the method 500 may be performed once the interlock function 300 from FIG. 3 is met and/or blocks 404, 406 from FIG. 4 are met. The method 500 may begin in block 502 where a brake controller may command a variable current to be supplied to a servo valve. For example, in various embodiments, the brake controller may supply an open loop transfer function (e.g., $P=150\times(i-5)$ where a gain of the servo valve is 150 psi/mA and a dead band is 5 mA), and a sine wave corresponding to a mid-point pressure (e.g., 1500 psi+/−10%), resulting in an open loop current command (e.g., $i=15+1.5\times\sin(2\times\pi\times50\times t)$).

In block 504, the brake controller may calculate an average phase shift over a predetermined period of time (e.g., two seconds, five seconds, or the like). For example, by monitoring the peaks and valleys of the current and pressure signals and the timing in between the peaks and valleys, the brake controller may determine an average delay or phase shift during the predetermined time period (e.g., two seconds, five seconds, or the like.

In various embodiments, the brake controller may receive an ambient temperature measurement from a temperature sensor of the aircraft. In this regard, the brake controller may assume ambient temperature is accurate because the brake controller is being powered up, so a brake control module with the brake controller would likely be the same temperature as an ambient temperature.

In block 506, the brake controller may compare the average phase shift from block 504 to a predetermined phase shift threshold. For example, the brake controller may compare the calculated phase shift from block 504 to a table stored in memory that provides the acceptable values of phase shifts for a given temperature. These acceptable values may be determined during the design and validation phases of the brake system. For example, a threshold phase shift at 50 Hz and room temperature may comprise 30 degrees. Thus, in various embodiments, a calculated phase shift at 50 Hz that exceeds 30 degrees may indicate the servo valve may need maintenance soon. In various embodiments, the predetermined phase shift threshold may be adjusted by the brake controller over time to adjust the method 500 more finely.

In block 508, the brake controller may count a number of phase shift exceedances over a number of power ups. For example, the brake controller may count the number of phase shift exceedances over a number of power ups in a row and provide an indication that service of a servo valve is need when the phase shift repeatedly exceeds the predetermined phase shift threshold over a predetermined number of brake controller power ups. In response to the phase shift repeatedly exceeding the predetermined phase shift threshold, the brake controller may generate a message that service will be needed soon to an indicator (e.g., indicator 260 from FIG. 2).

In various embodiments, the systems and methods described herein may provide a daily assessment over the life time of a brake control module of frequency response characteristics and potential degradation. In various embodiments, these systems and methods may provide early detection of a servo valve performance degradation and provide a means to perform preventative maintenance in a scheduled manner.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for performing frequency response health monitoring of a servo valve prior to flight of an aircraft, comprising:
   the servo valve; and
   a brake controller in electrical communication with the servo valve, the brake controller configured to:
      determine the brake controller is powering up,
      supply a variable current to the servo valve to perform the frequency response health monitoring to the servo valve in response to determining the brake controller is powering up, and
      determine a health status of the servo valve based on the frequency response health monitoring.

2. The system of claim 1, wherein the brake controller is further configured to calculate an average phase shift over a predetermined time period in response to supplying the variable current to the servo valve.

3. The system of claim 2, wherein the brake controller is further configured to compare the average phase shift to a phase shift threshold.

4. The system of claim 3, wherein the brake controller is further configured to count a number of phase shift exceedances over a plurality of brake controller power cycles.

5. The system of claim 4, wherein the brake controller is further configured to generate a message indicating a service will be needed soon to an indicator.

6. The system of claim 1, further comprising a first throttle and a second throttle, wherein the brake controller is further configured to determine both the first throttle and the second throttle are not in a forward position prior to performing the frequency response health monitoring.

7. The system of claim 1, further comprising a weight on wheels sensor, wherein the brake controller is configured to receive a measurement from the weight on wheels sensor and determine whether the aircraft is grounded.

8. A method of performing a frequency response health monitoring for a servo valve of a braking system, the method comprising:
   receiving, via a brake controller, a first indication whether an aircraft is grounded and not moving;
   receiving, via the brake controller, a second indication whether braking is being applied to the braking system;
   supplying, via the brake controller, a variable current to the servo valve in response to the first indication being true and the second indication being false;
   comparing, via the brake controller, an average phase shift over a predetermined period of time to a predetermined phase shift threshold; and
   determining, via the brake controller, whether the average phase shift exceeds the predetermined phase shift threshold.

9. The method of claim 8, further comprising determining, via the brake controller, the brake controller is powering up.

10. The method of claim 9, wherein the first indication and the second indication are received in response to the brake controller powering up.

11. The method of claim 8, wherein receiving the first indication further comprising receiving, via the brake controller, a throttle indicator indicating a throttle is not forward and a weight on wheels indicator indicating there is a weight on a wheel for a main landing gear.

12. The method of claim 8, further comprising counting, via the brake controller, a number of continuous phase shift exceedances over a plurality of brake controller power cycles.

13. The method of claim 12, further comprising determining, via the brake controller, the number of continuous phase shift exceedances over the plurality of brake controller power cycles exceeds a predetermined threshold of phase shift exceedances.

14. The method of claim 13, further comprising generating, via the brake controller, a service message in response to the number of continuous phase shift exceedances exceeding the predetermined threshold of phase shift exceedances.

15. A method of determining a service valve health status, the method comprising:
performing, via a brake controller, a plurality of frequency response health monitoring tests for a servo valve;
supplying, via the brake controller, a variable current to the servo valve for each frequency response health monitoring test in the plurality of frequency response health monitoring tests; and
comparing, via the brake controller, a phase shift over a predetermined period of time to a predetermined phase shift threshold.

16. The method of claim 15, further comprising in response to the phase shift exceeding the predetermined phase shift threshold:
counting, via the brake controller, a number of continuous phase shift exceedances.

17. The method of claim 16, further comprising generating, via the brake controller, a service message in response to the number of continuous phase shift exceedances exceeding a predetermined number of continuous phase shift exceedances.

18. The method of claim 15, wherein each test in the plurality of frequency response health monitoring tests are performed in response to the brake controller determining the brake controller is powering up.

19. The method of claim 15, wherein each test in the plurality of frequency response health monitoring tests is performed for a respective power cycle of the brake controller.

20. The method of claim 15, further comprising determining, via the brake controller, whether the phase shift exceeds the predetermined phase shift threshold.

* * * * *